April 5, 1966     L. S. WIRT     3,243,995
VIBRATION PRODUCING APPARATUS
Filed Oct. 2, 1961     2 Sheets-Sheet 1
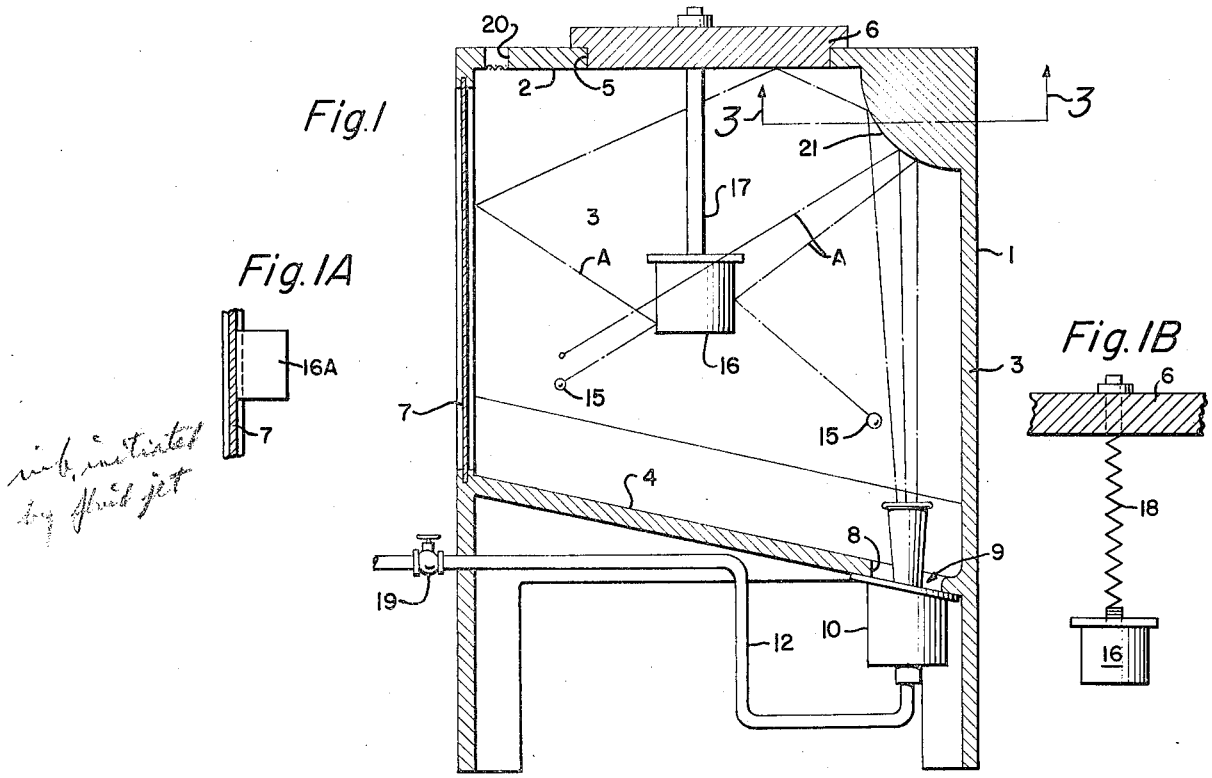
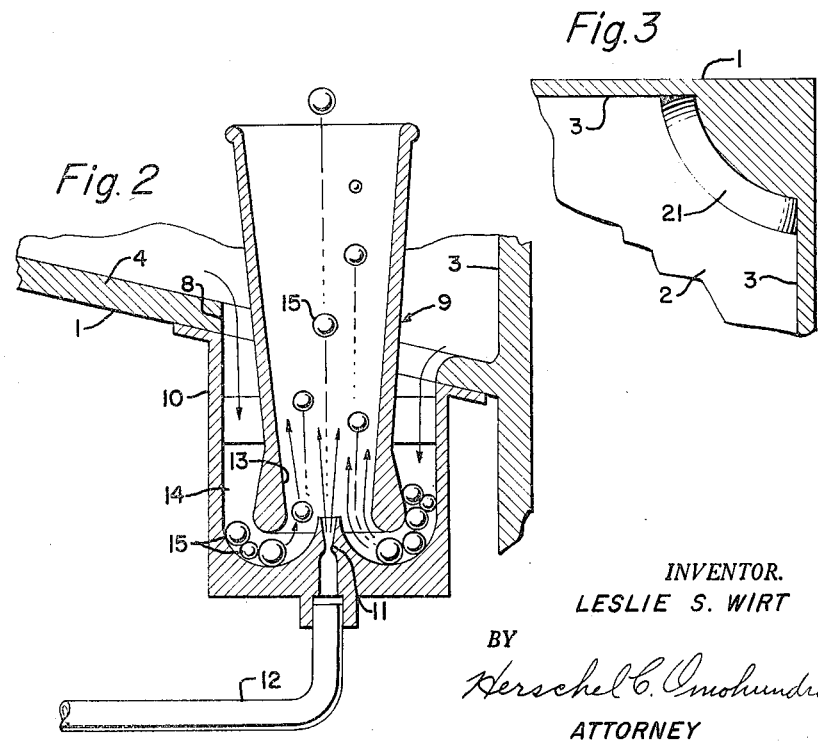
INVENTOR.
LESLIE S. WIRT
BY
Herschel C. Omohundro
ATTORNEY

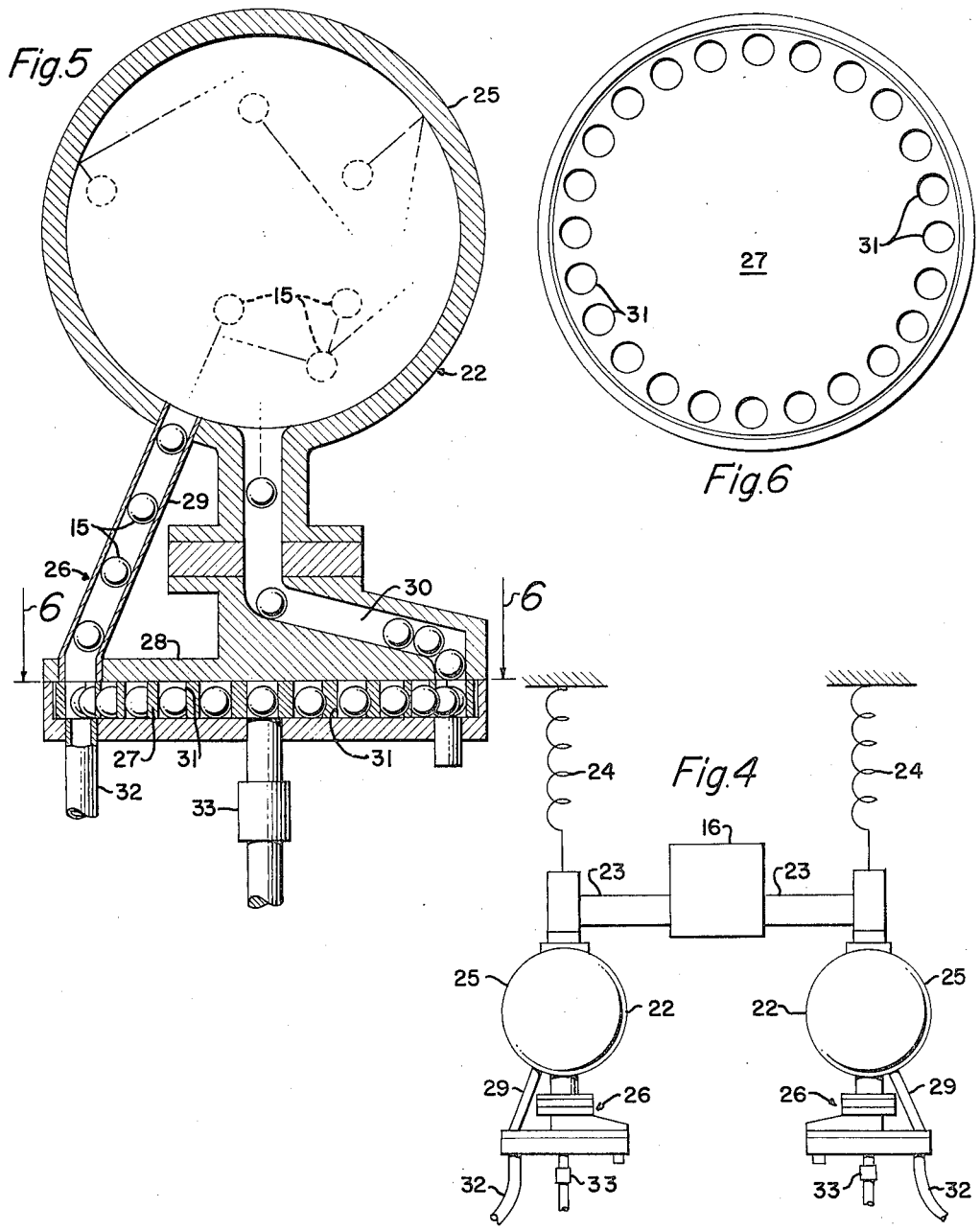

United States Patent Office 3,243,995
Patented Apr. 5, 1966

3,243,995
VIBRATION PRODUCING APPARATUS
Leslie S. Wirt, Phoenix, Ariz., assignor to The Garrett Corporation, Los Angeles, Calif., a corporation of California
Filed Oct. 2, 1961, Ser. No. 142,214
3 Claims. (Cl. 73—71.5)

The present invention relates to a vibration producing apparatus and is more particularly directed to means for generating high intensity excitations which are omnidirectional and of random frequency and magnitude.

In the qualification of many components of mechanisms used in the planes, missiles and other vehicles of the space age, one of the requirements is that the devices be subject to vibration tests to determine their ability to resist destructive vibratory impulses resulting from any cause. Heretofore, such tests have been performed by mounting the device on a shaker table which moves back and forth at various frequencies in each of three right-angularly related planes. These three planes have been selected because they most nearly simulate random or omnidirectional vibration with the available equipment. Such shaker tables are expensive. They only vibrate the article in one plane at a time and they require considerable attention of an operator in setting up the machine between the different phases of the tests. It is, therefore, an object of this invention to provide apparatus of a relatively simple nature which may be employed to test articles by subjecting them to vibratory forces simulating those which the articles will encounter during their intended use.

The objects of the invention may be secured by projecting a number of elastic bodies into a container whereby the bodies ricochet at random in every direction from collisions with each other and with the walls of the container. The rebounding bodies create a three-dimensional field of omnidirectional kinetic forces which are translated into random vibrations in articles that are disposed for reaction thereto.

The present concept introduces a method and means which are capable of translating kinetic energy into two distinct forms of vibratory response in the excited article. One form of excitation is the physical displacement of the article when it receives a kinetic impulse, that is, the article is moved out of its original location. The other form of response of a nonrigid article to a kinetic impulse is the internal elastic resonance or "ringing" of the article when it is struck.

Two general configurations of apparatus relative to the disposition of the article to be vibrated are comprehended by the present invention. One of these configurations provides structure including means for either rigidly or resiliently supporting an article in a field of agitated bodies, this article being exposed to direct collisions with the bodies. The other configuration utilizes means which forms a force transmitting connection between the article to be vibrated and the structure of a container that confines the agitated bodies. In the second instance, the article to be vibrated may not be exposed to direct impacts from the bodies. The kinetic energy is translated into vibrations by the container and these vibrations are transmitted via the connection between the container and article being vibrated.

Although the action of the agitated bodies is completely randomized by the collisions of the bodies with each other and collisions of the bodies with other elements, there exists an almost limitless number of controllable variations which alter the character of kinetically produced vibrations. These variations include the use of bodies having different characteristics, such as weight, density, hardness, and size. The average or initial velocities of the bodies may be varied to obtain different energy levels and the number of bodies may be changed to vary the frequency of kinetic impulses.

It is, therefore, an object of the present invention to provide means for producing randomized omnidirectional vibrations in an article to be tested.

Another object of the invention is to provide a means which is capable of simultaneously producing two distinct kinds of vibratory response in an article to be tested, these vibrations being completely random as to frequency, magnitude and direction.

Another object of the present invention is to provide a vibrator which excites an article to be tested by random omnidirectional impacts from moving bodies.

Another object of this invention is to provide vibration producing apparatus which is supported for free movement in all directions and is responsive to omnidirectional randomized kinetic forces.

A further object of the invention is to provide vibratory apparatus which allows the article being vibrated to move in three mutually perpendicular planes and rotate about three mutually perpendicular axes in response to omnidirectional kinetic forces.

Still another object of the invention is to provide a vibrator which exposes the article to be vibrated to direct collisions with a plurality of freely moving bodies.

A further object of the present invention is to provide means for simulating randomized noise at energy levels heretofore unattainable.

Other advantages and objects of the invention will become more fully appreciated with an understanding gained from the following detailed description and accompanying drawings wherein:

FIG. 1 is a vertical sectional view of one form of vibratory apparatus embodying the invention;

FIG. 1A is a detail sectional view showing a slightly modified manner of supporting the article undergoing vibration;

FIG. 1B is a similar view of a still further modified manner of supporting such an article;

FIG. 2 is a longitudinal sectional view showing details of an ejector mechanism used in the apparatus shown in FIG. 1;

FIG. 3 is a detail horizontal sectional view taken through the vibratory apparatus shown in FIG. 1 on the plane indicated by the line 3—3 of that figure;

FIG. 4 is a view in elevation showing an alternate form of vibratory apparatus embodying the invention;

FIG. 5 is a sectional view showing interior details of one vibrator element of the apparatus illustrated in FIG. 4; and FIG. 6 is a horizontal sectional view taken through the vibrator shown in FIG. 5 on the plane indicated by line 6—6 of FIG. 5.

As mentioned above, there are two general configurations of vibratory apparatus embodying the invention, these configurations being dependent upon the disposition of the article to be tested. The form constructed for exposing this article to direct impingement by the agitated bodies is shown in FIG. 1. The alternate configuration, having the article undergoing test connected by motion transmitting means to the exterior of the container, or containers, is illustrated in FIG. 4.

The apparatus shown in FIG. 1 comprises a container 1 which is provided with a top section 2, side walls 3, and a canted floor 4. The top section 2 is formed to include an access opening 5 which receives a removable cover 6. One or more of the side walls 3 may be provided with one or more flexible panels 7, if desired. These panels are provided to support the article to be vibrated in certain instances and are preferably made from high-strength material which can withstand the weight of said article, as well as large kinetic shocks and high intensity vibrations which may be imparted thereto during the operation of the apparatus. The floor 4 is inclined in two directions toward one corner of the container where it is provided with an opening 8. The opening 8 receives an ejector mechanism, indicated generally by the numeral 9, which is mounted to project upwardly from the floor 4 into the interior of the container 1.

The structural details of the ejector 9 are shown more particularly in FIG. 2 wherein a cup-shaped receptacle 10 is illustrated as being secured by any suitable means to the underside of the floor 4. The receptacle 10 is provided at its central portion with an upwardly directed nozzle 11, which communicates via a conduit 12 with a source (not shown) of air or other suitable gaseous fluid under pressure. A venturi element 13 is supported concentrically within the receptacle 10 and cooperates therewith to define an annular chamber 14. This chamber is open at its top for unrestricted communication via the opening 8 with the interior of the container 1.

Preparatory to operating the apparatus, the container 1 is charged with a predetermined quantity of spherical elastic bodies 15 which are of appropriate weight, density, hardness, and size. Since the floor 4 is canted toward the corner in which the injector 9 is located, the bodies 15 tend to collect in the open chamber 14 and automatically load it for operation. The article to be tested, designated generally by the numeral 16, may be mounted either on suspension means 17, which extends inwardly from the cover 6 to the approximate center of the container 1, or on the panel 7 as shown at 16A. The suspension means 17 may be constructed to form a rigid motion transmitting connection between the container 1 and the article 16, or it may have a resilient element, indicated in dotted lines as at 18, to permit relatively free movement of said object.

Operation of the apparatus is initiated by opening a valve 19 to permit air or other suitable gases under pressure to flow through the nozzle 11 at a predetermined velocity. The jet of air issuing from the nozzle 11 and flowing through the venturi 13 will induce a flow of air from the interior of the container 1 downwardly through the opening 8 and cup 10 into the lower or inlet end of the venturi 13. This flow of air will aspirate the bodies 15 in the chamber 14 into the jet stream. One or more of the container walls is provided with an outlet vent 20 to permit the escape of air. The bodies in the venturi 13 will be ejected at high velocities in a divergent stream toward a deflector 21 secured in the upper portion of the container over the ejector 9. The deflector illustrated has a partially spherical surface for impingement by the bodies 15 which ricochet in various directions, as indicated by the lines "A" in FIG. 1, from the deflector toward all six interior surfaces of the container 1, and thereafter tend to scatter omnidirectionally as a result of multiple collisions with the interior of the container and with other bodies. The process of multiple collisions of the bodies 15 tends to completely randomize their action and create a three-dimensional field of omnidirectional kinetic energy. If the article 16 is suspended in this field, it will receive impacts from the flying bodies at random intervals, or frequencies, and from all possible directions at many energy levels. The impingement of the bodies 15 against the article 16 will cause vibratory displacement thereof in space and internal resonance or "ringing" of said article. If the suspension means 17 forms a motion transmitting connection between the container 1 and the article 16, some of the vibratory energy imparted to the container 1 may also be transmitted to the article 16. If the additional energy transmitted from the container 1 is unnecessary or undesirable, the resilient means 18 may be utilized in certain instances to isolate the article 16 from the vibratory influence of the container 1 and to provide more freedom of movement of the article 16. When the resilient means 18 is employed, the article 16 is free to move in three mutually perpendicular planes and rotate about three mutually perpendicular axes in response to the kinetic forces.

In situations where the article to be vibrated is too fragile to withstand direct collisions with the bodies 15, the article may be protected by enclosing it in a shield whereby kinetic energy is translated by said shield into vibratory motion which is transmitted to the article.

Another means for mounting the article to be vibrated is shown at 16A. In this latter-mentioned instance, vibratory energy is imparted to the article by reactions of the panel 7 to the kinetic forces applied thereto by the bodies 15.

The device shown in FIG. 4 provides structure whereby the article to be vibrated is mounted outside the container which encloses the agitated bodies. This device comprises a pair of vibrators 22 which are connected to force transmitting means 23 and are suspended for relatively unrestrained unitary movement by resilient means in the form of springs 24.

The construction of the vibrators 22 is shown in detail in FIG. 5. Vibrators 22 are identical in every respect, and each comprises a hollow spherical container 25 which receives the bodies 15 that are forcibly propelled thereinto. The means for propelling the bodies 15 is in the form of a pneumatic gun, designated generally by the numeral 26. The gun 26 comprises a loader disc 27 disposed for rotation in a housing 28, such housing being mounted on the container and provided with a jet passage 29 and a return passage 30, both of which are in communication with the interior of the container 25. The loader 27 is formed to include a plurality of peripherally disposed receptacle 31 which are arranged to register one-by-one, as the loader is rotated, with the jet passage 29 and the return passage 30.

After the device shown in FIGS. 4 and 5 has been properly charged with bodies 15, the operation of the device is initiated by simultaneously rotating the loader 27 and supplying air under pressure to the passage 29. Since the source of air under pressure for the passage 29 and the source of rotary power for the loader 27 form no part of the invention, these sources are not shown. It will be noted, however, that the conduits 32 and shafts 33 leading to the vibrators 22 are constructed for maximum flexibility to obviate their interference with the movement of the device.

As the bodies 15 are rotated into registration with the passage 29 by the loader 27, they are shot into the container 25 by the airstream in the passage 29. The bodies entering the container 25 will collide with the walls thereof and with other bodies therein, causing randomized rebounding of said bodies and omnidirectional random vibrations of the entire device. The bodies 15 which have expended their energy will ultimately fall to the bottom of the container 25 and roll into the return passage 30. This passage directs the bodies to the receptacles 31 in the loader 27 for a new cycle of operation.

While but two general forms of apparatus have been shown, it will be obvious that many other forms may be provided and other sources of power for imparting motion to the bodies 15 may be employed without departing from the concept of the invention.

I claim:

1. Vibratory apparatus comprising: means forming a plurality of chambers; test article supporting means connected with said chamber forming means; at least one resilient body freely movable in every direction in each chamber; means supporting said chamber forming means for omnidirectional movement; fluid pressure responsive means for propelling said bodies in one direction into the respective chambers; and means for returning said bodies to said pressure responsive means to be repropelled into said chambers.

2. Vibratory apparatus, comprising: wall means forming a closed chamber; means for supporting an article to be tested in said chambers; means responsive to fluid pressure to forcibly project a plurality of resilient bodies across said chamber along a plurality of paths; and deflector means in said chamber in the initial paths of said resilient bodies, said deflector means causing said bodies to rebound along other paths toward the chamber wall means to impart impulses thereto and be redirected thereby.

3. Vibratory apparatus, comprising: wall means forming a closed chamber; means for supporting an article to be tested in motion transmitting engagement with said wall means; means responsive to fluid pressure to forcibly project a plurality of resilient bodies of different masses across said chamber along a plurality of paths; and means in said chamber in the initial paths of said resilient bodies for deflecting the same along other paths toward the chamber wall means to impart force impulses thereto and be redirected thereby.

References Cited by the Examiner
UNITED STATES PATENTS

| | | | |
|---|---|---|---|
| 445,860 | 2/1891 | De Place | 73—69 |
| 970,373 | 9/1910 | Hemstreet | 73—7 X |
| 1,107,244 | 8/1914 | Carter | 230—95 X |
| 1,654,819 | 1/1928 | Kinley | 73—69 |
| 2,264,412 | 12/1941 | Shindel | 73—12 |
| 2,585,657 | 2/1952 | Keefer | 73—12 |
| 2,607,213 | 8/1952 | Barton | 73—12 |
| 2,729,094 | 1/1956 | Piety | 73—12 |

OTHER REFERENCES

Abrasimeter Measures Wear Resistance: In Automotive Industries, issue of Dec. 7, 1935, page 762.

RICHARD C. QUEISSER, *Primary Examiner.*

JOHN P. BEAUCHAMP, *Examiner.*